No. 859,396. PATENTED JULY 9, 1907.
G. M. LYNCH.
HYDRAULIC MOTOR.
APPLICATION FILED APR. 13, 1905. RENEWED DEC. 14, 1906.
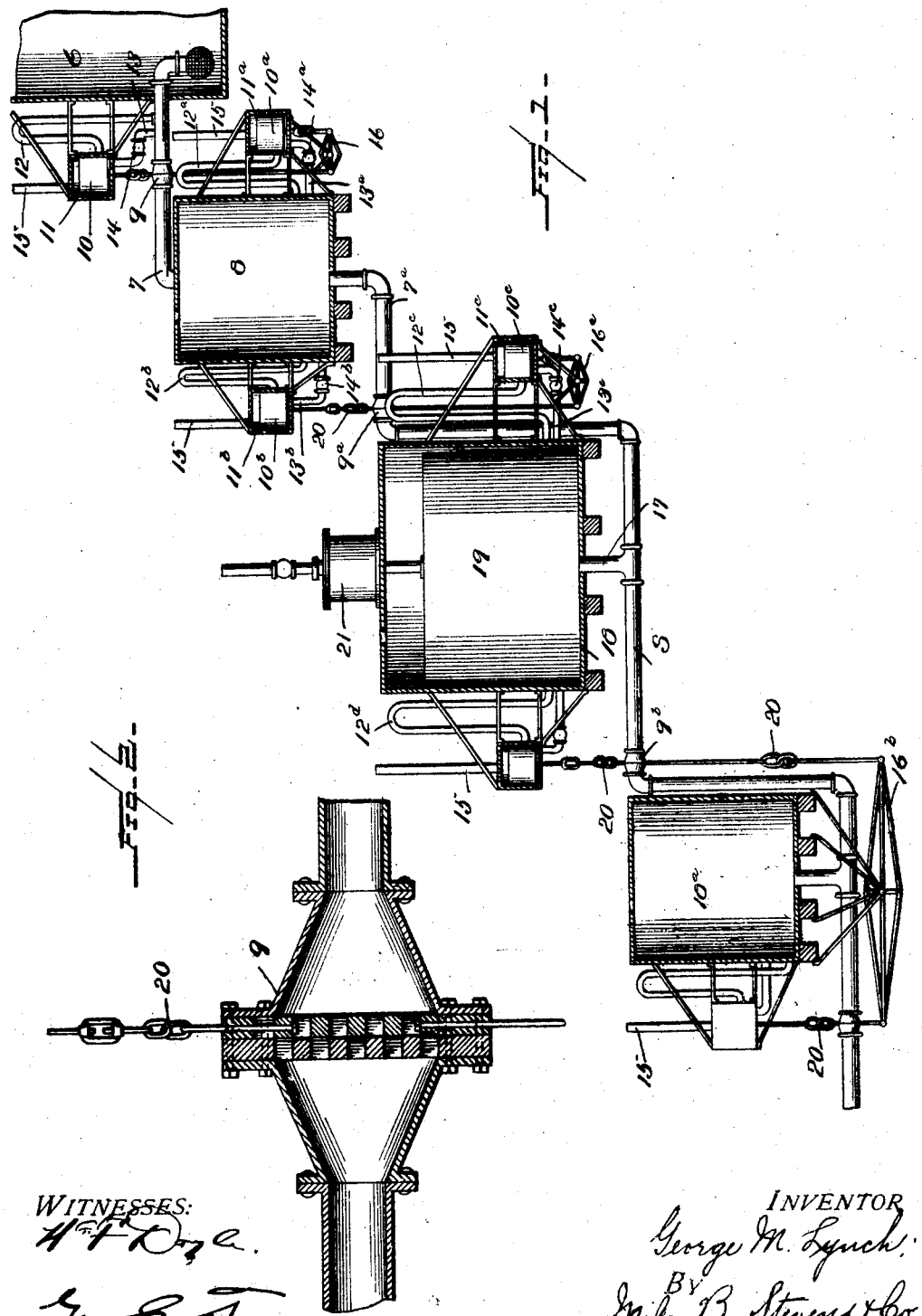
WITNESSES:
INVENTOR
George M. Lynch,
BY
Milo B. Stevens & Co.
Attorneys.

UNITED STATES PATENT OFFICE.

GEORGE MONO LYNCH, OF LOS ANGELES, CALIFORNIA.

HYDRAULIC MOTOR.

No. 859,396.          Specification of Letters Patent.          Patented July 9, 1907.

Application filed April 13, 1905. Renewed December 14, 1906. Serial No. 347,881.

*To all whom it may concern:*

Be it known that I, GEORGE MONO LYNCH, a citizen of the United States, residing at the city of Los Angeles, in the county of Los Angeles and State of California, have invented new and useful Improvements in Hydraulic Motors, of which the following is a specification.

This invention is a hydraulic motor, designed to utilize the buoyant qualities of a series or battery of floats, to compress air or otherwise generate power.

It is known that the buoyancy of a float does not depend upon its being surrounded by a large body of water, hence under proper conditions a small body of water may be utilized to take advantage of the buoyant quality of the float.

This invention includes a series of such floats, contained in tanks, to which water will be supplied and from which it will be withdrawn by an automatic valve arrangement also operated by floats, the water connections being such that the water which escapes from one tank will pass to the next below, and is again used there.

The invention is illustrated in the accompanying drawings, in which

Figure 1 is a sectional view illustrating the motor, and Fig. 2 is a detail in section of a valve.

Referring specifically to the drawings, 6 indicates a primary or accumulating reservoir or tank, which may be of any desired size, and which may be supplied with water from any suitable source, such as a stream or spring. This discharges through a pipe 7 into a main supply tank 8. This tank 8 regulates the supply of water to the main or power tank 18. Its dimensions are such that it will contain an amount of water just sufficient to fill said main tank, such water being supplied to the latter in a manner to be hereinafter described. The pipe 7 has therein a valve 9, connected above to a float 10 which works in a small tank 11 located beside the reservoir 6.

12 indicates a bent pipe having ascending and descending legs connected between the pipe 7 and the tank 11, and 13 indicates an outlet pipe from the tank, having therein a check valve 14 which prevents water from backing up through the pipe 13.

15 is an air inlet pipe to the top of the tank.

The valve 9 is connected below to a lever or working beam 16 which is in turn connected to a float $10^a$ in a tank $11^a$ connected to the tank 8 by a bent pipe $12^a$ and an outlet pipe $13^a$ having therein a check valve $14^a$. The capacity of the main supply tank 8 is substantially equal to the capacity of one of the motor tanks hereinafter described, with its appurtenant tanks and water connections.

The main supply tank 8 is connected by a pipe $7^a$ to an inlet 17 into the bottom of one of the motor tanks 18 containing the motor floats 19. The pipe $7^a$ has therein a valve $9^a$ which is connected above to a float $10^b$ in a casing $11^b$ located beside the main supply tank 8 and connected thereto by a bent pipe $12^b$ and outlet pipe $13^b$ having a check valve $14^b$. The valve $9^a$ is also connected below to a lever $16^a$, and float $10^c$ in a tank $11^c$ having connection with the tank 18 by means of a bent pipe $12^c$ and outlet pipe $13^c$ with check valve $14^c$.

A succession of tanks may be connected to the pipe 8, as shown, each tank having float mechanism controlling the valves above and below the same and operating to alternately open and close the same, such valve connections and operating means being duplicated all down the series or battery of tanks.

Loose links 20 are interposed in the valve connections with the floats 10, $10^a$, etc. to allow the drop of said floats without affecting the valves. The valves 9, $9^a$, etc., are opened by the tanks above the same and closed by the tanks below the same. One of the valves is shown in detail in Fig. 2, being of the gridiron type, to give a large opening with small movement.

In operation, when water rises in the tank 6 to the crown of the bent pipe 12 the water flows through said bent pipe into the tank 11 and lifts the float 10. Said float pulls up and opens the valve 9. This allows the water to flow from tank 6 into the tank 8 until it reaches the crown of the bent pipe $12^a$. It also empties the tank 11 through the pipe 13 and allows the float to drop. When the water reaches the crown of the bent pipe $12^a$ it flows through the bent pipe and fills the tank $11^a$ raising the float $10^a$ and by means of the reversing lever 16 pulls down and closes the valve 9, shutting off the supply. At the same time the water rises and flows through the bent pipe $12^b$ and by similar operation of the float $10^b$ lifts and opens the valve $9^a$, allowing the water to flow into the tank 18. This lifts the float 19. Water flows into the tank 18 until it reaches the height of the crown of the bent pipe $12^c$ through which it then flows into the tank $11^c$ and by means of the float $10^c$ and its connections closes the valve $9^a$, and at the same time water flowing through the bent pipe $12^d$ will by similar connections open the next lower valve $9^b$ and empty the tanks 18 and $11^c$. And so the operation is repeated down the series of tanks. The floats are nearly as large as the tanks so that but little water is needed to operate the same, and the water may be used repeatedly by the addition of tanks at a lower level. In the embodiment shown the up and down motion given the floats is utilized to operate the pistons of air pumps 21, which is a convenient way to utilize the power developed.

The vent pipes 15 are advisably of a height equal to the height of the tanks beside which they stand, so that there will be no waste of water therefrom. The crowns of the bent pipes are just below the tops of the tanks, so that the valves will be operated before the tanks run over. The final receiving tank, indicated at 18ª, is merely to operate the final valves, being connected thereto by a lever 16ᵇ operated by a float valve tank in a manner similar to that above described.

What I claim as new and desire to secure by Letters Patent is:—

1. A hydraulic motor comprising a main tank having valved inlet and outlet pipes, a float in the tank, minor tanks located beside said tank and having floats therein, inlet and outlet pipes connecting the main and minor tanks, connections between the floats in the minor tanks and the valves in the inlet and outlet pipes respectively, to operate the latter, means to open the valve in the inlet pipe, and means to close the valve in the outlet pipe.

2. A hydraulic motor comprising a main tank having a power float therein, a supply and outlet pipe connected to the tank, inlet and outlet valves in said pipe, minor tanks connected by inlet and outlet pipes with the main tank and having therein floats connected to and adapted to move said valves respectively one way, and means to move each valve the other way.

3. In a hydraulic motor, in combination, a succession of tanks one of which has a power float therein, a supply pipe connected from each tank to the next, a valve in the pipe between successive tanks, minor tanks having therein floats connected to said valves and receiving their supply from the main tanks, each valve being connected to a float of an upper and a lower tank, to respectively open and close the connection between the main tanks.

In testimony whereof I have signed my name to this specification in the presence of two subscribing witnesses.

GEORGE MONO LYNCH.

Witnesses:
E. HANSEN,
J. MARION BROOKS.